(12) United States Patent
Chen et al.

(10) Patent No.: US 10,974,390 B2
(45) Date of Patent: Apr. 13, 2021

(54) AUTONOMOUS LOCALIZATION AND NAVIGATION EQUIPMENT, LOCALIZATION AND NAVIGATION METHOD, AND AUTONOMOUS LOCALIZATION AND NAVIGATION SYSTEM

(71) Applicant: SHANGHAI SLAMTEC CO., LTD., Shanghai (CN)

(72) Inventors: ShiKai Chen, Shanghai (CN); YiChun Liu, Shanghai (CN); Ling Lin, Shanghai (CN); Jueshen Huang, Shanghai (CN); YuXiang Li, Shanghai (CN)

(73) Assignee: SHANGHAI SLAMTEC CO., LTD., Shanghai (CN)

( * ) Notice: Subject to any disclaimer, the term of this patent is extended or adjusted under 35 U.S.C. 154(b) by 375 days.

(21) Appl. No.: 15/779,521

(22) PCT Filed: Dec. 5, 2016

(86) PCT No.: PCT/CN2016/108594
§ 371 (c)(1),
(2) Date: May 27, 2018

(87) PCT Pub. No.: WO2017/097170
PCT Pub. Date: Jun. 15, 2017

(65) Prior Publication Data
US 2018/0345504 A1    Dec. 6, 2018

(30) Foreign Application Priority Data

Dec. 10, 2015 (CN) .......................... 201510916639.9

(51) Int. Cl.
*B25J 9/16* (2006.01)
*G01C 21/00* (2006.01)
(Continued)

(52) U.S. Cl.
CPC ............ *B25J 9/1697* (2013.01); *G01C 21/00* (2013.01); *G01C 21/005* (2013.01); *G01C 21/20* (2013.01);
(Continued)

(58) Field of Classification Search
CPC .......... B25J 9/1697; G06T 7/277; G06T 7/75; G01C 21/00; G01C 21/005; G01C 21/21;
(Continued)

(56) References Cited

U.S. PATENT DOCUMENTS

| | | | |
|---|---|---|---|
| 10,282,697 B1 * | 5/2019 | Mincher | G06Q 10/087 |
| 2011/0046784 A1 * | 2/2011 | Anderson | G05D 1/0251 |
| | | | 700/259 |
| 2011/0106338 A1 * | 5/2011 | Allis | G05D 1/0038 |
| | | | 701/2 |

FOREIGN PATENT DOCUMENTS

| | | | |
|---|---|---|---|
| CN | 2911609 Y | 6/2007 | |
| CN | 103398702 A | 11/2013 | |
| (Continued) | | | |

*Primary Examiner* — Nicholas Kiswanto
(74) *Attorney, Agent, or Firm* — Bayramoglu Law Offices LLC

(57) ABSTRACT

The objective of the present invention is to provide an autonomous localization and navigation equipment which has the following advantages. The autonomous localization and navigation equipment is highly modularized, which greatly reduces the coupling degree with the host equipment, so the equipment is convenient to be integrated to the existing host equipment and it is flexibly expandable. Thus, the host equipment such as a robot etc. has a more concise and clear system constitution, thereby greatly reducing the development difficulty and developing time of the host equipment having the autonomous localization and navigation equipment 1. Moreover, as a result of the high degree of (Continued)

modularization of the autonomous localization and navigation equipment, it is possible to miniaturize the host equipment.

22 Claims, 6 Drawing Sheets

(51) Int. Cl.
    *G05D 1/02*     (2020.01)
    *G06T 7/277*     (2017.01)
    *G06T 7/73*     (2017.01)
    *G01C 21/20*     (2006.01)
    *G01C 21/30*     (2006.01)
    *G06K 9/00*     (2006.01)

(52) U.S. Cl.
    CPC .............. *G01C 21/30* (2013.01); *G05D 1/02* (2013.01); *G05D 1/024* (2013.01); *G05D 1/0248* (2013.01); *G05D 1/0274* (2013.01); *G06K 9/00671* (2013.01); *G06T 7/277* (2017.01); *G06T 7/75* (2017.01)

(58) Field of Classification Search
    CPC .......... G01C 21/30; G05D 1/02; G05D 1/024; G05D 1/0248; G05D 1/0274; G06K 9/00671
    See application file for complete search history.

(56) References Cited

FOREIGN PATENT DOCUMENTS

| | | |
|---|---|---|
| CN | 204595519 U | 8/2015 |
| CN | 105137949 A | 12/2015 |
| CN | 106114633 A | 11/2016 |

\* cited by examiner

AUTONOMOUS LOCALIZATION AND NAVIGATION EQUIPMENT, LOCALIZATION AND NAVIGATION METHOD, AND AUTONOMOUS LOCALIZATION AND NAVIGATION SYSTEM

CROSS REFERENCE TO RELATED APPLICATIONS

This application is the national phase entry of International Application PCT/CN2016/108594, filed on Dec. 5, 2016 which is based upon and claims priority to Chinese Patent Application No. 201510916639.9, filed on Dec. 10, 2015 the entire contents of which are incorporated herein by reference.

TECHNICAL FIELD

The present invention relates to the field of robots, particularly to the localization and navigation technology.

BACKGROUND

Autonomous localization and navigation function is the key to realize the practicality of service robotic equipment, which allows robot to autonomously construct a map of the area through sensor data without human assistance, and localize itself in the environment in real-time. Further, the constructed map data and position information are used for navigation, the robot should plan the path intelligently, go to the target location assigned, and effectively avoid obstacles such as pedestrians, furniture, etc. in the environment.

Currently, the above-mentioned autonomous localization and navigation function is realized by simultaneous localization and mapping (SLAM) algorithm and motion planning algorithm in the industry. The simultaneous localization and mapping algorithm allows the robot to construct a map of any unknown environment while simultaneously perform localization in real-time through specific sensor data. Such algorithm is the most effective one for autonomous localization and navigation at present. For the action of the robot, a certain motion planning algorithm should be used to plan the motion track of robot and make the robot dynamically avoid various obstacles and reach the destination safely in the action.

However, there are many challenges to run the above-mentioned algorithms directly in service robots at present. First of all, since these kinds of algorithms are highly coupled to the robots itself, currently, there is no universal ready-made algorithm that can be run in any robot without modifications. As a result, robot developers need to redesign and develop the above-mentioned simultaneous localization mapping and motion planning algorithms for different robots. However, only developers that have well-knit theoretical knowledge can implement such type of algorithms, and the implementation process is complicated and time-consuming. Therefore, there are merely a few competitive manufacturers and academic institutions capable of effectively using the autonomous localization and navigation algorithm directly in the robots developed in house. Currently, ROS (Robot Operating System) is made for the attempt to implement such type of universal algorithm in the industry, where each algorithm module is a module with independent interface, so it is easier for developers to use. However, since ROS is merely a software-level system without the ability to collaborate with the low-level and high-level layers of a specific robotic system, the ROS cannot address the problems faced in the use of such type of algorithms. On the other hand, as a result of the complexity of this type of algorithms itself, at present, even the mainstream computer systems are subjected to large load pressure in running such algorithms. To make such algorithms efficiently run in service robots using embedded computing systems with relatively low computing performance, the developers should optimize the existing algorithms to a certain extent for implementations, thereby further increasing the difficulty of directly using such algorithms. Moreover, in order to realize the functions of mapping, real-time localization, and obstacles avoidance, the developers are supposed to equip the robot with many kinds of sensors to provide data for the above-mentioned algorithms. The performance differences and the correction effects of various sensors also greatly affect the implementation of the navigation and localization algorithm.

Regarding the above-mentioned situations, currently, the autonomous localization and navigation function is difficult to be applied in most service robots. Nowadays, since the robots with the function of autonomous localization and navigation in the market are often possessed by large-scale competitive enterprises and research institutions, and the system is highly coupled and incompatible, current robot software systems are difficult to be reused among different robots, such that the industrialization of service robots is greatly hindered.

The most direct way to solve the problems faced at present is to implement the localization and navigation function in independent modular system, so as to release the work burden of service robot developers from repetitive navigation and localization algorithm implementations. However, the expandable flexibility and coupling degree with external systems of existing implementations are hard to be balanced. The navigation and localization equipment that can be rapidly integrated into robots always has unchangeable and single functions, such that it is difficult for users to extend their desired functions based on such navigation and localization equipment, while the equipment with greater expansion flexibility also has a high external dependence with the robot system, so such equipment has a great technical difficulty in integration.

The root of this problem lies in the fact that such kind of localization and navigation algorithm highly depends on the configuration of sensors, the size and shape of robot, and the driving mode of different robot platforms. That is to say, the autonomous localization and navigation equipment is highly coupled with the robotic host equipment. As a result of such degree of coupling, the developers of the robotic system as a host should do more preparation works to adapt an autonomous localization and navigation equipment. Besides, since the specific operating behaviors of a robot are defined according to the use of the robot, for example, the sweeping robot requires the motion planning algorithm to perform in a path planning mode where the sweeping robot moves along the edge of the wall and then reciprocates in a bow-shaped path, whereas a security patrol robot is required to complete a patrolling of the area with the possibly lowest cost. At present, there is no autonomous localization and navigation equipment that can handle such differentiations of business logics well.

SUMMARY

The objectives of the present invention are to provide a highly modularized autonomous localization and navigation equipment, a method to implement localization and navigation based on the autonomous localization and navigation equipment, and a localization and navigation system implemented based on the autonomous localization and navigation equipment, so as to reduce the dependence on host equipment of the autonomous localization and navigation equipment, and improve its self-expansibility.

To achieve the foregoing objectives, an autonomous localization and navigation equipment is provided according to one aspect of the present application. The autonomous localization and navigation equipment is used to localize and navigate a host equipment.

The autonomous localization and navigation equipment includes: a first transmission device, a second transmission device, and a processing device; wherein, the first transmission device performs a data communication with a low-level device of the host equipment to obtain low-level localization and navigation related information and send a motion control command for controlling a movement of the host equipment;

the second transmission device performs a data communication with a high-level device of the host equipment to obtain high-level localization and navigation related information and send motion related logical data to the host equipment to perform a business logic analysis;

the processing device acquires a plurality of items of sensing information, the low-level localization and navigation related information, and the high-level localization and navigation related information, and generates the motion related logic data and the motion control command.

A method for localization and navigation using an autonomous localization and navigation equipment is provided according to another aspect of the present application, wherein, the autonomous localization and navigation equipment is used to localize and navigate a host equipment. The autonomous localization and navigation equipment includes a processing device, a first transmission device, and a second transmission device; wherein the method includes:

A. acquiring, by the first transmission device, low-level localization and navigation related information from a low-level control device of the host equipment, and acquiring, by the second transmission device, high-level localization and navigation related information from a high-level control device of the host equipment;

B. acquiring, by the processing device, a plurality of items of sensing information, the low-level localization and navigation related information, and the high-level localization and navigation related information, and generating, by the processing device, a motion control command for controlling a movement of the host equipment and motion related logic data for the host equipment to perform a business logical analysis;

C. sending, by the first transmission device, the motion control command to a low-level control device of the host equipment, sending, by the second transmission device, the motion related logic data to a high-level control device of the host equipment.

A localization and navigation method is provided according to another aspect of the present application, wherein the method includes:

a. acquiring low-level localization and navigation related information and high-level localization and navigation related information of a host equipment;

b. acquiring a plurality of items of sensing information and pre-processing and pre-fusing the plurality of items of sensing information;

c. generating a motion control command for controlling a movement of the host equipment and motion related logic data for the host equipment to perform a business logical analysis based on pre-processed and pre-fused plurality of items of sensing information, the low-level localization and navigation related information, and the high-level localization and navigation related information;

d. sending simultaneous localization data, mapping data, motion planning logic data, and the motion control command to the host equipment.

An autonomous localization and navigation equipment is further provided according to yet another aspect of the present application, wherein the autonomous localization and navigation equipment includes:

a first device configured to acquire low-level localization and navigation related information and high-level localization and navigation related information of a host equipment;

a second device configured to acquire a plurality of items of sensing information and pre-process and pre-fuse the plurality of items of sensing information;

a third device configured to generate a motion control command for controlling a movement of the host equipment and motion related logic data for the host equipment to perform a business logical analysis based on pre-processed and pre-fused plurality of items of sensing information, the low-level localization and navigation related information, and the high-level localization and navigation related information;

the first device is also configured to send simultaneous localization data, mapping data, motion planning logic data, and motion control command to the host equipment.

Compared with the prior art, according to the embodiments of the present application, the autonomous localization and navigation equipment of the present application has the following advantages. The autonomous localization and navigation equipment is highly modularized, which greatly reduces the coupling degree with the host equipment, so the equipment is convenient to be integrated to the existing host equipment and is flexibly expandable. Thus, the host equipment such as a robot etc. has a more concise and clear system constitution, thereby greatly reducing the development difficulty and developing period of the host equipment having the autonomous localization and navigation equipment. Moreover, as a result of the highly modularization of the autonomous localization and navigation equipment, it is possible to miniaturize the host equipment.

Further, by inducing most of the sensing information dependencies required by the autonomous localization and navigation equipment, the processing of the plurality of items of sensing information is integrated to the autonomous localization and navigation equipment itself, thereby reducing the coupling degree with the host equipment.

Further, with the first transmission device and the second transmission device, a unified external communication interface and a protocol standard with high flexibility are formed by the autonomous localization and navigation equipment, so that any host equipment conforming to the protocol standard of the interface can be easily connected to the autonomous localization and navigation equipment 1 and realize the functional expansion.

BRIEF DESCRIPTION OF THE DRAWINGS

Other features, objectives, and advantages of the present invention will become more apparent by reading the detailed description of the non-limiting embodiments referring to the following drawings.

The same or similar reference numerals in the drawings denote the same or similar components.

DETAILED DESCRIPTION OF THE EMBODIMENTS

The present invention will be further described in detail hereinafter with reference to the drawings.

The present application aims to provide a highly modularized autonomous localization and navigation equipment and an autonomous localization and navigation equipment, so as to reduce the dependence on the host equipment and improve the self-extendibility.

Figure 1:
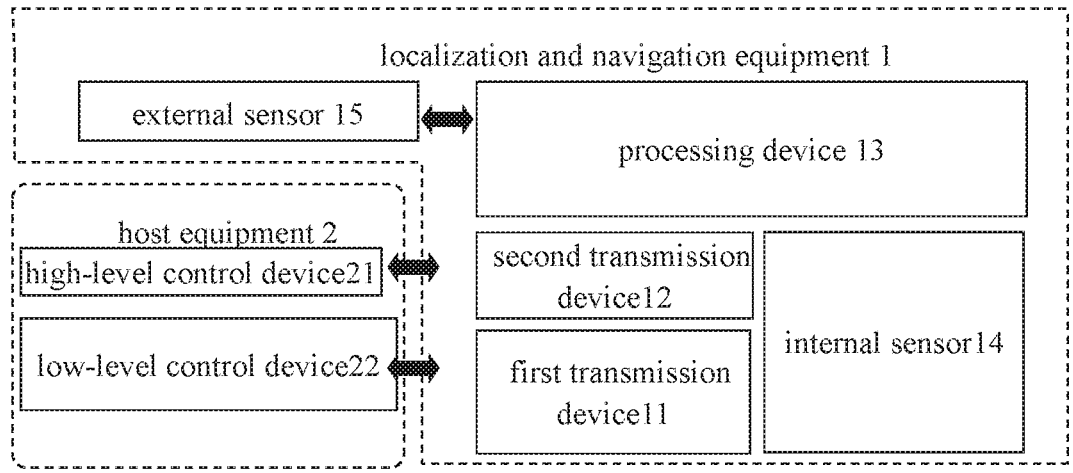
FIG. 1 is a cooperation structural schematic diagram of an autonomous localization and navigation equipment provided according to an aspect of the present application and a host equipment.

FIG. 1 shows a cooperation structural schematic diagram of an autonomous localization and navigation equipment provided according to an aspect of the present application and a host equipment, wherein, the autonomous localization and navigation equipment 1 is configured to provide localization and navigation function for the host equipment 2, and the autonomous localization and navigation equipment 1 includes a first transmission device 11, a second transmission device 12 and a processing device 13.

The first transmission device 11 performs data communication with the low-level control device of the host equipment 2 to acquire the low-level localization and navigation related information and send motion control command for controlling the movement of the host equipment 2. The transmission device 12 performs data communication with the high-level device of the host equipment 2 to acquire high-level localization and navigation related information and send motion related logic data for the host equipment 2 to perform business logic analysis. The processing device 13 acquires a plurality of items of sensing information, the low-level localization and navigation related information, and the high-level localization and navigation related information, and generates the motion related logic data and the motion control command.

Here, the host equipment 2 may be a mechanical device capable of automatic execution, such as a robot etc. The host equipment 2 not only can be conducted by human, but also can run pre-written programs, or act according to principles established by artificial intelligence technology to assist or replace human work. The host equipment 2 has a high-level control device which can process business logic, analyze and set action targets. Also, the host equipment 2 has a low-level control device which can drive the actuator to move, i.e. make the host equipment 2 to operate various actions with the assistance of the power elements according to the control signal sent by the control device. The input control signal is an electrical signal and the output control signal is the linear and angular displacement. The driving device used by the host equipment 2 may be an electrical driving device (mechanical wheel set) such as a stepping motor, a servomotor, etc. Also, the driving device may be a hydraulic or pneumatic driving device etc. Preferably, the autonomous localization and navigation equipment 1 is set on the host equipment 2.

Here, the low-level localization and navigation related information may include the wheel set state information of the host equipment 2. Further, the low-level localization and navigation related information may also include parameter information of the host equipment 2. The high-level localization and navigation related information may include a request of motion planning that the host equipment 2 needs to perform and/or a request of motion control that the host equipment 2 needs the low-level control device to perform. The motion related logic data includes the mapping data, simultaneous localization data and motion planning logic data.

Specifically, the first transmission device 11 performs data communication with the low-level device of the host equipment 2 to acquire the low-level localization and navigation related information and send the motion control command for controlling the movement of the host equipment 2. The first transmission device 11 (control signal interface) is mainly used to acquire the low-level operating state of the host equipment 2, such as the motor working state and wheel encoder data. Meanwhile, the motion control command to the host equipment 2 from the autonomous localization and navigation equipment 1 is sent through the first transmission device 11.

The autonomous localization and navigation equipment 1 and the host equipment 2 exchange data in the first transmission device 11 by using a predefined unified communication protocol. Preferably, a UART (Universal Asynchronous Receiver Transmitter) serial interface is used in the first transmission device 11 for implementation, because the UART serial interface is supported by almost all the microcontrollers and embedded devices, so as long as the processing of the predefined communication protocol is implemented by the host equipment 2, the cooperation of the autonomous localization and navigation equipment 1 and the host equipment 2 can be realized, thereby the integration of the host equipment 2 and the autonomous localization and navigation equipment 1 can be facilitated as much as possible. Furthermore, according to the specific application requirements, interfaces such as CAN (Controller Area Network) bus, SPI (Serial Peripheral Interface) bus, I²C (Inter-Integrated Circuit) bus, etc. can enable the form of interfaces of control signal communication to be used in the first transmission device 11. Additionally, one autonomous localization and navigation equipment 1 may further include physical interfaces in any number and any type to realize the data communication of the first transmission device 11.

Further, in order to adapt to different types of sensors, an abstract external sensor data acquisition protocol is further defined on the first transmission device 11, so as to support all type of sensors.

In a preferred embodiment, the protocol data type transmitted by the first transmission device 11 includes the parameter information of the host equipment 2 sent from the host equipment 2 to the autonomous localization and navigation equipment 1, wheel set state information, sensing information of host equipment 2, and motion control command sent from the autonomous localization and navigation equipment 1 to the host equipment 2. The parameter information of the host equipment 2 describes related configuration parameters of the host equipment 2, such as, but not limited to, equipment size, driving mode, type of sensors installed, and position, etc. The wheel set state information describes the operation data of each wheel set of the host equipment 2, such as, but not limited to, odometer information. The sensing information of host equipment 2 describes the abstract data definition of additional sensors set on the host equipment 2 which are supposed to be processed by the autonomous localization and navigation equipment 1. The motion control command describes a description of the movement of the desired host equipment 2 identified by the localization and navigation. The motion control command includes a description stating that the autonomous navigation equipment 1 wants the host equipment 2 to move.

Figure 3:
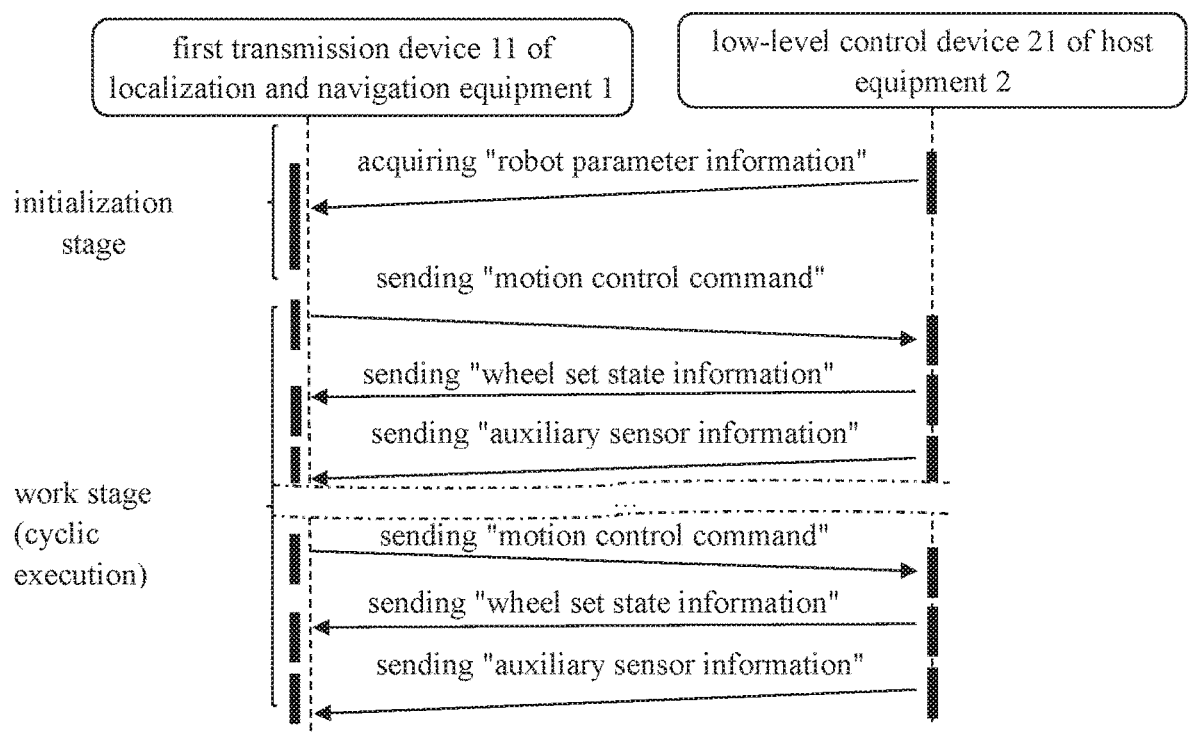
FIG. 3 is a schematic diagram showing a data transmission in a cooperation of a first transmission device of an autonomous localization and navigation equipment provided according to a preferred embodiment of the present application and a low-level control device of a host equipment.

FIG. 3 is a schematic diagram showing a data transmission in cooperation of the first transmission device of the autonomous localization and navigation equipment 1 according to a preferred embodiment of the present application and the low-level control device of the host equipment 2. From the moment when the autonomous localization and navigation equipment 1 starts to operate, first the host equipment 2 needs to provide the autonomous localization and navigation equipment 1 with parameter information of the host equipment 2 containing information related to itself. The parameter information of the host equipment 2 is used to describe the platform characteristics of the current host equipment 2, such as self-size information, driving mode (two-wheel differential driving/omni-directional wheel structure, etc.), installation position and angle of external sensors (i.e. external sensor), and if other sensors are additionally installed, the related descriptive information of such sensors should be provided to the autonomous localization and navigation equipment 1.

After the parameter information of the host equipment 2 is received, the autonomous localization and navigation equipment 1 needs to perform the necessary initialization to adapt to the current host equipment 2. Subsequently, the autonomous localization and navigation equipment 1 will periodically send the motion control command to the host equipment 2. The motion control command is used to describe a movement mode that the autonomous localization and navigation equipment 1 requires the host equipment 2 to perform at the next moment. For the robot using two-wheel differential driving, the motion control command may be the desired operating speed of the left and right wheel sets. For the robot using omnidirectional wheels, the motion control command may be linear velocity (v) and angular velocity (w) of the translation and rotation performed by the robot at the next moment. While the autonomous localization and navigation equipment 1 periodically sends the motion control command, the host equipment 2 also needs to periodically send the wheel set state information describing the self-movement condition to the autonomous localization and navigation equipment 1. Generally, such information includes the displacement change and heading angle change of the host equipment 2 with respect to the previous moment. For the host equipment 2 using the two-wheel differential driving, the wheel set state information to be sent may be the cumulative rotation number of the left and right wheels or the odometer information of the cumulative travelling distance.

Meanwhile, if one or more additional sensors are installed in the host equipment 2, the sensing information of host equipment 2 may also be periodically sent to the autonomous localization and navigation equipment 1. The sensing information of host equipment 2 includes the uniformly defined sensor data description information. The autonomous localization and navigation equipment 1 may process the additional external sensors by receiving the sensor data description information, thereby extending the functions.

Those skilled in the art should be able to understand that the above mentioned data is a minimum data type set that must be transmitted through the first transmission device 11 to ensure the normal operation of the autonomous localization and navigation equipment 1, and is merely a preferred example of the data transmitted during the communication between the first transmission device 11 of the autonomous localization and navigation equipment 1 and the low-level control device 21 of the host equipment 2. In order to extend and enhance the functions of the autonomous localization and navigation equipment 1, various types of additional data protocols may be added in specific implementation, other data transmission types applicable to the present application and suitable for the communication between the first transmission device 11 of the autonomous localization and navigation equipment 1 and the low-level control device 21 of the host equipment 2 can still be included herein by reference.

Further, the second transmission device 12 is connected to the high-level control device of the host equipment 2 for data communication. The second transmission device 12 (high speed signal interface) is used to realize the data interactions between the autonomous localization and navigation equipment 1 and the high-level control device of the host equipment 2. For example, collaboration data related to the business logics such as mapping data, localization coordinates and control path planning data, and behavior data of the host equipment 2 etc. are all transmitted through the second transmission device 12.

Preferably, the second transmission device 12 uses the Ethernet interface with the 802.11 standard in implementation to realize the communication with the external host equipment 2 in large data throughput. According to application demands, the second transmission device 12 may also include a WIFI wireless communication interface, a USB interface, an optical fiber interface etc., which can also realize communication method with a large amount of data interaction. Besides, as a result of different demands in specific implementation, the high speed signal interface may include multiple sets of Ethernet interfaces and various different types of interface formats, for example, a wired Ethernet interface and a wireless WIFI interface may be provided at the same time.

In a preferred embodiment, the second transmission device 12 is responsible for transmitting mapping data, synchronous localization data including position attitude information and localization state information, and the motion planning logic data including the motion state information from the autonomous localization and navigation equipment 1 to the high-level control device of the host equipment 2, and transmitting the motion execution request and the low-level motion control request from the host equipment 2 to the high-level control device of the autonomous localization and navigation equipment 1. The mapping data includes mapping data of a specific area constructed by the autonomous localization and navigation equipment 1. The position attitude information includes the spatial position and attitude information of the current host equipment 2 calculated by the autonomous localization and navigation equipment 1. The localization state information includes the mapping size and localization state (such as covariance, whether the localization is successful or not) calculated by the autonomous localization and navigation equipment 1. The motion state information includes the motion planning algorithm information being executed at present by the autonomous localization and navigation equipment 1, such as but not limited to, a planned path at the moment when the path is being planned. The motion execution request includes a request packet of the built-in motion planning algorithm where an execution of the autonomous localization and navigation equipment 1 is required by the host equipment 2. The low-level motion control request includes a request packet where the host equipment 2 requires the autonomous localization and navigation equipment 1 to directly control the movement of the low-level system of the host equipment, such as but not limited to, request of controlling the robot to go to a specific destination.

Specifically, the mapping data describes the mapping data information that the host equipment 2 is interested in. Such mapping data is always located in a part of the environmental mapping built by the autonomous localization and navigation equipment 1 in advance. The host equipment 2 may randomly acquire the data from the autonomous localization and navigation equipment 1 as needed. The position attitude information includes the current location coordinates and attitude information of the host equipment 2 calculated by the autonomous localization and navigation equipment 1. For example, for a wheeled robot using a laser scanner (LIDAR) to perform two-dimensional environmental movement, such information may be the coordinates (x,y) of the robot on the plane and the heading angle$\Theta$. The host equipment 2 can randomly acquire the data from the autonomous localization and navigation equipment 1 as needed, or the autonomous localization and navigation equipment 1 may actively push the data to the host equipment 2. The localization state information is used to describe the current working conditions of localization and map construction of the autonomous localization and navigation equipment 1, and the work conditions include the total size of the constructed map at present, localization accuracy information, whether the localization is successful or not, and other data sets required by the host equipment 2. The host equipment 2 can randomly acquire the data from the autonomous localization and navigation equipment 1 as needed, or the autonomous localization and navigation equipment 1 may actively push the data to the host equipment 2. The motion state information describes the execution condition of the motion planning algorithm being performed by the autonomous localization and navigation equipment 1, currently. For example, information such as the type of the motion planning algorithm being run (idle, path planning, return back to get charged autonomously, etc.), the planned path data for moving to a target location, and the control quantity of the movement that the host equipment 2 is required to perform etc. The host equipment 2 may randomly acquire the data from the autonomous localization and navigation equipment 1 as needed, or the autonomous localization and navigation equipment 1 may actively push the data to the host equipment 2. The motion execution request is for the host equipment 2 to initiate a relevant description data of the motion planning algorithm built inside the autonomous localization and navigation equipment 1 to the autonomous positioning and navigation equipment 1. In the general implementations, the relevant description data includes the type of the motion planning algorithm that is desired to execute by the host equipment 2 (stop all actions, path planning, return back to get charged autonomously, etc.) and related parameters (target location coordinates, moving speed, etc.). Such information is actively initiated by the host equipment 2 to the autonomous localization and navigation equipment 1. The low-level motion control request is for the host equipment 2 to directly issue a motion related control command request to the low-level control device 21 of the host equipment 2 through the autonomous localization and navigation equipment 1. The data packet is used to implement logical rewriting and expansion of existing motion control algorithms within the autonomous localization and navigation equipment 1. In general implementations, the request can make the host equipment 2 to directly perform low-level movements such as forward movement, backward movement, and rotation at a specific speed etc. For two-wheel differential driving robots, the low-level motion control request may also contain direct control data for motor revolving speed of the left and right wheels.

Those skilled in the art should understand that the data transmitted in the communication between the second transmission device 12 of the autonomous localization and navigation equipment 1 and the high-level control device 22 of the host equipment 2 is a preferred example, it includes the sets of the minimum data packet protocols that should be supported, other data types applicable to the present application and suitable to be transmitted between the second transmission device 12 of the autonomous localization and navigation equipment 1 and the high-level control device 22 of the host equipment 2 may still be contained herein by reference.

In the autonomous localization and navigation equipment 1 of the present application, the communication standard and dependency relationship between the autonomous localization and navigation equipment 1 and the host equipment 2 are specified through the collaboration of the first transmission device 11 and the second transmission device 12. The interaction and data dependence of the autonomous localization and navigation equipment 1 and the host equipment 2 both occur on one of the communication interface links of the first transmission device 11 and the second transmission device 12.

Further, the processing device 13 acquires a plurality of items of sensing information, the low-level localization and navigation related information, and the high-level localization and navigation related information, and generates the motion related logic data and the motion control command. Specifically, the processing device 13 generates the mapping data and synchronous localization data based on the plurality of items of sensing information, the low-level localization and navigation related information, and the high-level localization and navigation related information, and generates the motion planning logic data and the motion control command based on the synchronous localization data, the mapping data, and the high-level localization and navigation related information of the host equipment 2.

Further, the first transmission device 11 may also acquire the host equipment 2 sensing information of the sensors belonging to the host equipment 2 itself from the low-level control device of the host equipment 2. The processing device 13 may perform the data processing in combination of the host equipment 2 sensing information and the plurality of items of sensing information. Specifically, the first transmission device 11 further acquires the host equipment 2 sensing information from the low-level control device of the host equipment 2. The processing device 13 generates the motion control related information of the host equipment 2 based on the host equipment 2 sensing information, the plurality of items of sensing information, the low-level localization and navigation related information, and the high-level localization and navigation related information.

Preferably, the low-level localization and navigation related information further includes parameter information of the host equipment 2. In the initialization stage of the autonomous localization and navigation equipment 1 and the host equipment 2, the first transmission device 11 acquires the parameter information, the processing device 13 generates motion initial control command based on the parameter information, and the first transmission device 11 sends the motion initial control command to the low-level device of the host equipment 2.

Further, the autonomous localization and navigation equipment 1 further includes an internal sensor 14 and an external sensor 15. The processing device 13 acquires a plurality of items of sensing information from the internal sensor 14 and the external sensor 15.

Preferably, the internal sensor 14 includes at least any one of the following items: gyroscope, acceleration sensor, electronic compass, temperature sensor, humidity sensor, and air pressure sensor. The external sensor includes at least any one of the following items: laser scanner (LIDAR), sonar radar, vision sensor, or UWB (Ultra-Wideband) beacon sensor.

Here, the internal sensor 13 is a series of sensors integrated inside the autonomous localization and navigation equipment 1. In the implementations, the internal sensor 14 may include inertial navigation sensors using MEMS (Micro-Electro-Mechanical System) technology such as gyroscope, accelerometer, and electronic compass etc., and one or more sensor selected from temperature sensor, humidity sensor, air pressure sensor. The characteristic of the internal sensor 14 is that it can be directly placed inside the autonomous localization and navigation equipment 1 and can be physically integrated and installed, for example, the internal sensor 14 may be placed on the PCB (Printed Circuit Board) inside the autonomous localization and navigation equipment 1 etc., so as to collect the related inside sensing data by itself without the assistance of the external host equipment 2. Additionally, the internal sensor 13 may include more different types of sensors according to the specific implementation and application demands.

The internal sensing information acquired by the internal sensor 14 may be used to determine the pitching angle, rolling angle, heading angle, altitude information, ambient temperature, and humidity of the environment where the autonomous localization and navigation equipment 1 is currently located, so as to facilitate the processing device 13 to perform attitude solving tasks of host equipment 2.

Here, preferably, the external sensor 15 includes one or more item selected from laser scanner (LIDAR), visual sensor (a camera, etc.), UWB (Ultra-Wideband) beacon sensor, etc. The specific selection is related to the specific algorithm run in the autonomous localization and navigation equipment 1. A number of and various types of external sensors 15 may be included as a result of different localization and navigation algorithm. For example, in order to enhance the localization and map construction effects, a plurality of laser scanners (LIDAR) and a plurality of vision sensor components may be simultaneously used in one autonomous localization and navigation equipment 1. The difference between the external sensor 15 and the internal sensor 13 is that the external sensor 15 needs to perform direct measurement and observation in the external environment, thus cannot be directly placed inside the autonomous localization and navigation equipment 1 like the internal sensor 13 and should be exposed outside to measure the physical environment directly. The installation position and angle of the external sensor 15 and the related description information of other additionally installed sensors are transmitted through the first transmission device 11 during the initialization stage of the autonomous localization and navigation equipment 1.

In a preferred embodiment of the present application, in the specific implementations of hardware apparatus, some of the above mentioned devices may be physically designed within the same chip, or a same component may be constituted by a plurality of different separated hardwares as a result of the selection of a specific hardware chip of the autonomous localization and navigation equipment 1. Besides, in order to run the equipment, additional functional units such as internal power management devices may be added in the specific implementations. However, these parts are not necessarily hardware units that constitute the autonomous localization and navigation equipment 1 of the present invention.

In a preferred embodiment, the processing device 13 is mainly used to run the algorithms related to the automatic localization and navigation, for example, including but not limited to: simultaneous localization and mapping (SLAM), path planning algorithm, obstacle avoiding algorithm, and an algorithm performing spatial attitude resolving of robot based on internal sensor data. In the implementations, the processing device 13 may be constituted by one or more computer systems, or a pure hardware such as a specialized ASIC (application specific integrated circuit) chip or a FPGA (field-programmable gate array) chip, etc. When a general computer system is used, the unit may include one or more CPU (Central Processing Units), random access memory (RAM), and ROM (read-only memory) for storing permanent programs and data.

Alternatively, the processing device 13 includes a main processing unit and a sub-processing unit. The main processing unit generates the motion related logic data and the motion control command of the host equipment 2 based on the plurality of items of sensing information, the low-level localization and navigation related information, and the high-level localization and navigation related information. The sub-processing unit acquires the sensing information from the internal sensor in real-time to acquire attitude resolving tasks and send the motion control command to the low-level control device of the host equipment 2 through the first transmission device.

Figure 2:
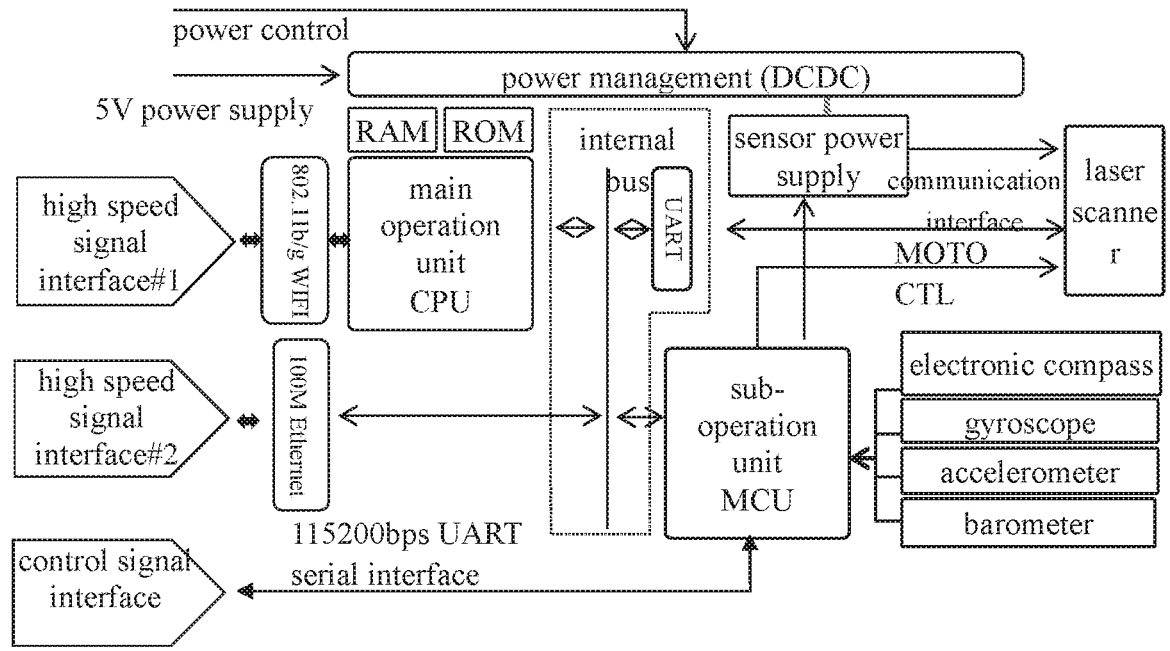
FIG. 2 is a structural schematic diagram of an autonomous localization and navigation equipment according to a preferred embodiment of the present application.

FIG. 2 shows a structural schematic diagram of an autonomous localization and navigation equipment 1 according to a preferred embodiment of the present application. The control signal interface shown here corresponds to the first transmission device 11 in FIG. 1, and the high-speed signal interface shown here corresponds to the second transmission device 12 in FIG. 1. The processing device 13 includes a main processing unit and a sub-processing unit. The main operation unit (preferably, a CPU) corresponds to the main processing unit shown in FIG. 1. The sub-operation unit (preferably, MCU, Microcontroller Unit) corresponds to the sub-processing unit shown in FIG. 1. For easier description, the first transmission device 11 and the control signal interface, the second transmission device and the high-speed signal interface, the main processing unit and the main operation unit, the sub-processing unit and the sub-operation unit may be used interchangeably in this embodiment, respectively.

In the implementation, the processing device 13 includes a main operation unit and a sub-operation unit. The main operation unit has a relatively strong operating capability, and most of the localization and navigation algorithms are arranged herein to perform operations. The sub-operation unit is implemented by a micro-controller which has a relatively low operation capability while a good real-time performance, therefore, it is used to perform attitude resolving task based on the data acquired from the internal sensors. Also, sub-operation unit is responsible for implementing the control signal interfaces defined in the equipment and communicating with the low-level control device of the external host equipment 2. In the above mentioned implementations, two physical interfaces for implementing the high-speed signal interfaces, a 100M Ethernet interface and an 802.11b/g WIFI wireless network interface, are included. The host equipment 2 can communicate with the localization and navigation module through any one of the specific physical interfaces as needed.

Additionally, the electronic compass, gyroscope, accelerometer, and barometer in FIG. 2 constitute the internal sensor which can collect the pitching angle, rolling angle, heading angle, and altitude information of the autonomous localization and navigation equipment 1 in the current environment. In the above mentioned implementation, the laser scanner (LIDAR) is used as a matched external sensor.

It should be noted that the foregoing is merely a reference design implementation on the hardware of the autonomous localization and navigation equipment of the present application. In order to implement the equipment of the application, other solutions that can realize the equivalent hardware configuration and the external interfaces may also be used.

Compared with the prior art, in the autonomous localization and navigation equipment 1 according to the preferred embodiment of the present application, by inducing most of the sensors necessary for the autonomous localization and navigation equipment 1, using inertial navigation sensors such as gyroscopes, accelerometers, and electronic compasses etc. as internal sensor, physically integrating the internal sensor inside the autonomous positioning and navigation equipment 1, and physically collocating with external sensor such as laser, scanner (LIDAR), or visual sensor etc. directly, almost all sensor data that the localization and navigation relied on are processed in the processing device inside the autonomous localization and navigation equipment 1. Therefore, the dependence on the sensors of the host equipment 2 is greatly reduced, and the autonomous localization and navigation equipment 1 would complete the localization and navigation operation even if the host equipment 2 is not equipped with additional sensors, thereby well solving the problem that the existing localization and navigation equipment is highly coupled with the host equipment 2, and flexible extendability is ensured at the same time.

Figure 4:
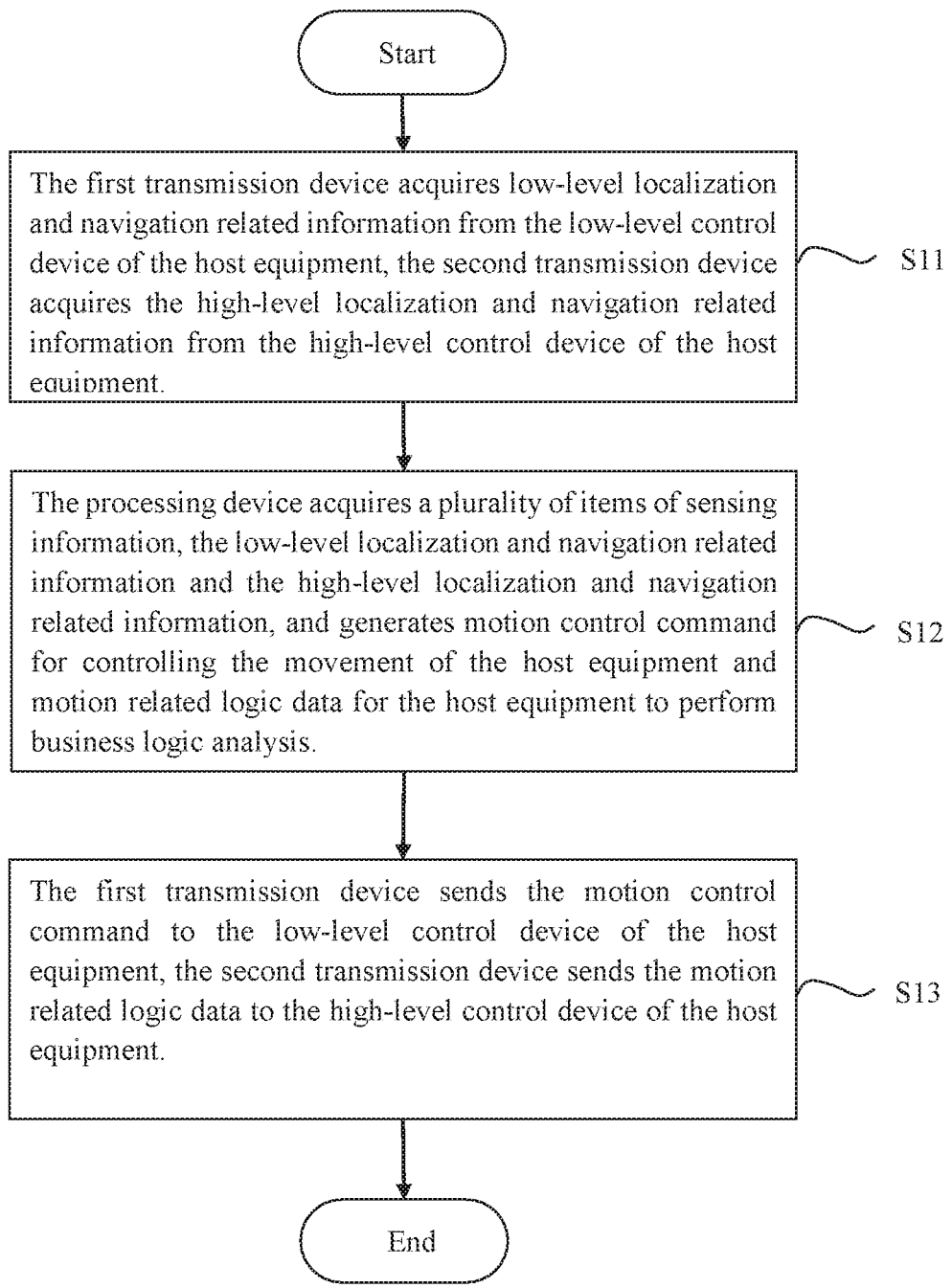
FIG. 4 shows a localization and navigation method of an autonomous localization and navigation equipment provided according to another aspect of the present application.

FIG. 4 shows a localization and navigation method of an autonomous localization and navigation equipment 1 according to an aspect of the present application. The autonomous localization and navigation equipment 1 is used to localize and navigate host equipment 2. The autonomous localization and navigation equipment 1 includes a processing device, a first transmission device, and a second transmission device. The method includes: Step S11, Step S12, and Step S13.

In the step S11, the first transmission device acquires low-level localization and navigation related information from the low-level control device of the host equipment 2, and the second transmission device acquires the high-level localization and navigation related information from the high-level control device of the host equipment 2. In the step S12, the processing device acquires a plurality of items of sensing information, the low-level localization and navigation related information, and the high-level localization and navigation related information, and generates motion control command for controlling the movement of the host equipment 2 and motion related logic data for the host equipment 2 to perform business logic analysis. In the step S13, the first transmission device sends the motion control command to the low-level control device of the host equipment 2, and the second transmission device sends the motion related logic data to the high-level control device of the host equipment 2.

Here, the host equipment 2 may be a mechanical device capable of automatic operation, such as a robot etc. The host equipment 2 not only can be conducted by human, but also can run pre-written programs, or act according to principles established by artificial intelligence technology to assist or replace human work. The host equipment 2 has a high-level control device which can process business logic, analyze and set action targets. Also, the host equipment 2 has a low-level control device which can drive the actuator to move, i.e. make the host equipment 2 to operate various actions with the assistance of the power elements according to the control signal sent by the control device. The input control signal is an electrical signal and the output control signal is the linear and angular displacement. The driving device used by the host equipment 2 may be an electrical driving device (mechanical wheel set) such as a stepping motor, a servomotor, etc. Also, the driving device may be a hydraulic or pneumatic driving device etc.

Here, the low-level localization and navigation related information may include the wheel set state information of the host equipment 2. The high-level localization and navigation related information may include a request of motion planning that the host equipment 2 needs to perform and/or a request of motion control that the host equipment 2 needs the low-level control device to perform. The motion related logic data includes the mapping data, simultaneous localization data and motion planning logic data.

Specifically, in the step S11 and the step S13, the first transmission device 11 performs data communication with the low-level device of the host equipment 2, and the second transmission device 12 performs data communication with the high-level device of the host equipment 2. The first transmission device acquires low-level localization and navigation related information from the low-level control device of the host equipment 2, and the second transmission device acquires the high-level localization and navigation related information from the high-level control device of the host equipment 2. The first transmission device sends the motion control command to the low-level control device of the host equipment 2, and the second transmission device sends the motion related logic data to the high-level control device of the host equipment 2.

Here, the content of related to the first transmission device is the same or substantially the same as the content related to the first transmission device 11 shown in FIG. 1. The content related to the second transmission device is the same or substantially the same as the content related to the second transmission device 12 shown in FIG. 1. For the sake of keeping it brief, the details are merely included herein by reference rather than repeating again.

In the localization and navigation method of the present application, communication standard and dependency relationship of the autonomous localization and navigation equipment 1 and the host equipment 2 are specified through the collaboration of the first transmission device 11 and the second transmission device 12. The interaction and data dependence of the autonomous localization and navigation equipment 1 and the host equipment 2 both take place on one of the communication interface links of the first transmission device 11 and the second transmission device 12.

FIG. 3 is a schematic diagram showing a data transmission in the cooperation of the first transmission device of the autonomous localization and navigation equipment 1 according to a preferred embodiment of the present application and the low-level control device of the host equipment 2. From the moment when the autonomous localization and navigation equipment 1 starts to operate, first the host equipment 2 needs to provide the autonomous localization and navigation equipment 1 with parameter information of the host equipment 2 containing information related to itself. The parameter information of the host equipment 2 is used to describe the platform characteristics of the current host equipment 2, such as self-size information, driving mode (two-wheel differential driving/omni-directional wheel structure, etc.), installation position and angle of external sensors, and if other sensors are additionally installed, the related descriptive information of such sensors should be provided to the autonomous localization and navigation equipment 1.

After the parameter information of the host equipment 2 is received, the autonomous localization and navigation equipment 1 needs to perform the necessary initialization to adapt to the current host equipment 2. Subsequently, the autonomous localization and navigation equipment 1 will periodically send the motion control command to the host equipment 2. The motion control command is used to describe a movement mode that the autonomous localization and navigation equipment 1 requires the host equipment 2 to perform at the next moment. For the robot using two-wheel differential driving, the motion control command may be the desired operating speed of the left and right wheel sets. For the robot using omnidirectional wheels, the motion control command may be linear velocity (v) and angular velocity (w) of the translation and rotation performed by the robot at the next moment. While the autonomous localization and navigation equipment 1 periodically sends the motion control command, the host equipment 2 also needs to periodically send the wheel set state information describing the self-movement condition to the autonomous localization and navigation equipment 1. Generally, such information includes the displacement change and heading angle change of the host equipment 2 with respect to the previous moment. For the host equipment 2 using the two-wheel differential driving, the wheel set state information to be sent may be the cumulative rotation number of the left and right wheels or the odometer information of the cumulative travelling distance.

Meanwhile, if one or more additional sensors are installed in the host equipment 2, the sensing information of host equipment 2 may also be periodically sent to the autonomous localization and navigation equipment 1. The sensing information of host equipment 2 includes the uniformly defined sensor data description information. The autonomous localization and navigation equipment 1 may process the additional external sensors by receiving the sensor data description information, thereby extending the functions.

Those skilled in the art should be able to understand that the above mentioned data is a minimum data type set that must be transmitted through the first transmission device 11 to ensure the normal operation of the autonomous localization and navigation equipment 1, and is merely a preferred example of the data transmitted during the communication between the first transmission device 11 of the autonomous localization and navigation equipment 1 and the low-level control device 21 of the host equipment 2. In order to extend and enhance the functions of the autonomous localization and navigation equipment 1, various types of additional data protocols may be added in specific implementation, other data transmission types applicable to the present application and suitable for the communication between the first transmission device 11 of the autonomous localization and navigation equipment 1 and the low-level control device 21 of the host equipment 2 can still be included herein by reference.

In a preferred embodiment, the second transmission device 12 is responsible for transmitting mapping data, synchronous localization data including position attitude information and localization state information, and the motion planning logic data including the motion state information from the autonomous localization and navigation equipment 1 to the high-level control device of the host equipment 2, and transmitting the motion execution request and the low-level motion control request from the host equipment 2 to the high-level control device of the autonomous localization and navigation equipment 1. The mapping data includes mapping data of a specific area constructed by the autonomous localization and navigation equipment 1. The position attitude information includes the spatial position and attitude information of the current host equipment 2 calculated by the autonomous localization and navigation equipment 1. The localization state information includes the mapping size and localization state (such as covariance, whether the localization is successful or not) calculated by the autonomous localization and navigation equipment 1. The motion state information includes the motion planning algorithm information being executed at present by the autonomous localization and navigation equipment 1, such as but not limited to, a planned path at a moment when the path is being planned. The motion execution request includes a request packet of the built-in motion planning algorithm where an execution of the autonomous localization and navigation equipment 1 is required by the host equipment 2. The low-level motion control request includes a request packet where the host equipment 2 requires the autonomous localization and navigation equipment 1 to directly control the movement of the low-level system of the host equipment 2, such as but not limited to, request of controlling the robot to go to a specific destination.

Specifically, the mapping data describes the mapping data information that the host equipment 2 is interested in. Such mapping data is always located in a part of the environmental mapping built by the autonomous localization and navigation equipment 1 in advance. The host equipment 2 may randomly acquire the data from the autonomous localization and navigation equipment 1 as needed. The position attitude information includes the current location coordinates and attitude information of the host equipment 2 calculated by the autonomous localization and navigation equipment 1. For example, for a wheeled robot using a laser scanner to perform two-dimensional environmental movement, such information may be the coordinates (x,y) of the robot on the plane and the heading angleθ. The host equipment 2 can randomly acquire the data from the autonomous localization and navigation equipment 1 as needed, or the autonomous localization and navigation equipment 1 may actively push the data to the host equipment 2. The localization state information is used to describe the current work conditions of localization and map construction of the autonomous localization and navigation equipment 1, and the work conditions include the total size of the constructed map at present, localization accuracy information, whether the localization is successful or not, and other data sets required by the host equipment 2. The host equipment 2 can randomly acquire the data from the autonomous localization and navigation equipment 1 as needed, or the autonomous localization and navigation equipment 1 may actively push the data to the host equipment 2. The motion state information describes the execution condition of the motion planning algorithm being performed by the autonomous localization and navigation equipment 1, currently. For example, information such as the type of the motion planning algorithm being run (free, path planning, return back to get charged autonomously, etc.), the planned path data for moving to a target location, and the control quantity of the movement that the host equipment 2 is required to perform etc. The host equipment 2 may randomly acquire the data from the autonomous localization and navigation equipment 1 as needed, or the autonomous localization and navigation equipment 1 may actively push the data to the host equipment 2. The motion execution request is for the host equipment 2 to initiate a relevant description data of the motion planning algorithm built inside the autonomous localization and navigation equipment 1 to the autonomous positioning and navigation equipment 1. In the general implementations, the relevant description data includes the type of the motion planning algorithm that is desired to execute by the host equipment 2 (stop all actions, path planning, return back to get charged autonomously, etc.) and related parameters (target location coordinates, moving speed, etc.). Such information is actively initiated by the host equipment 2 to the autonomous localization and navigation equipment 1. The low-level motion control request is for the host equipment 2 to directly issue a motion related control command request to the low-level control device 21 of the host equipment 2 through the autonomous localization and navigation equipment 1. The data packet is used to implement logical rewriting and expansion of existing motion control algorithms within the autonomous localization and navigation equipment 1. In general implementations, the request can make the host equipment 2 to directly perform low-level movements such as forward movement, backward movement, and rotation at a specific speed etc. For two-wheel differential driving robots, the low-level motion control request may also contain direct control data for motor revolving speed of the left and right wheels.

Those skilled in the art should understand that the data transmitted in the communication between the second transmission device 12 of the autonomous localization and navigation equipment 1 and the high-level control device 22 of the host equipment 2 is a preferred example, it includes the sets of the minimum data packet protocols that should be supported, other data types applicable to the present application and suitable to be transmitted between the second transmission device 12 of the autonomous localization and navigation equipment 1 and the high-level control device 22 of the host equipment 2 may still be contained herein by reference.

Then, in the step S12, the processing device acquires a plurality of items of sensing information, the low-level localization and navigation related information, and the high-level localization and navigation related information, and generates the motion control command for controlling the movement of the host equipment 2 and the motion related logical data for the host equipment 2 to perform the business logic analysis.

Here, the content related to the processing device is the same as or substantially the same as the content related to the processing device 13 shown in FIG. 1. For the sake of keeping the description brief, the details are merely included herein by reference rather than repeating again.

Further, the autonomous localization and navigation equipment 1 further includes internal sensors and external sensors. The step S12 further includes: acquiring, by the processing device, a plurality of items of sensing information from the internal sensors and external sensors.

The content related to the internal sensor is the same or substantially the same as the content related to the internal sensor 14 shown in FIG. 1, and the content related to the external sensor is the same or substantially the same as the content related to the external sensor 15 shown in FIG. 1. For the sake of keeping it brief, the details are merely included herein by reference rather than repeating again.

Further, the step S11 further includes: acquiring, by the first transmission device, the sensing information of the host equipment 2 from the low-level control device of the host equipment 2. The step S12 includes: generating, by the processing device, the motion control related information of the host equipment 2 based on the sensing information of host equipment 2, a plurality of items of sensing information, the low-level localization and navigation related information, and the high-level localization and navigation related information.

Further, the low-level layer localization and navigation related information includes wheel set state information of the host equipment 2. The high-level localization and navigation related information includes a request of motion planning that the host equipment 2 needs to perform and/or a request of motion control that the host equipment 2 needs the low-level control device to perform. The motion related logic data includes mapping data, synchronous localization data, and motion planning logic data. The step S12 includes: generating, by the processing device, the mapping data and synchronous localization data based on the plurality of items of sensing information, the low-level localization and navigation related information, and the high-level localization and navigation related information, and generating, by the processing device, the motion planning logic data and the motion control command based on the synchronous localization data, the mapping data, and the high-level localization and navigation related information of the host equipment 2.

Preferably, in the initialization stage of the autonomous localization and navigation equipment 1 and the host equipment 2, the step S12 further includes: generating, by the processing device, a motion initial control command based on the parameter information. The step S13 further includes: sending, by the first transmission device, the motion initial control command to the low-level device of the host equipment 2.

Figure 5:
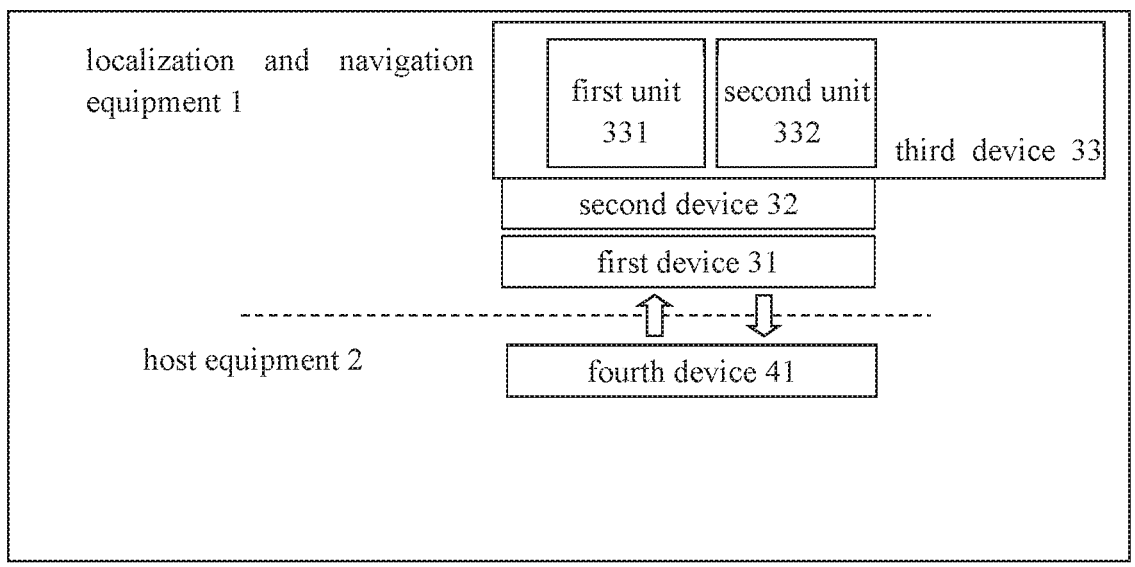
FIG. 5 is a cooperation structural schematic diagram of an autonomous localization and navigation equipment provided according to a preferred embodiment of the present application and a host equipment.

FIG. 5 shows a cooperation structural schematic diagram of an autonomous localization and navigation equipment 1 and a host equipment 2 according to a preferred embodiment of the present application. The autonomous localization and navigation equipment 1 includes: a first device 31, a second device 32 and a third device 33.

The first device 31 is used to acquire low-level localization and navigation related information and high-level localization and navigation related information of the host equipment 2. The second device 32 is used to acquire a plurality of items of sensing information and pre-process and pre-fuse the plurality of items of sensing information. The third device 33 is used to generate the motion control command for controlling the movement of the host equipment 2 and motion related logic data for the host equipment 2 to perform business logic analysis based on pre-processed and pre-fused plurality of items of sensing information, the low-level localization and navigation related information, and the high-level localization and navigation related information. The first device 31 is further used to send the synchronous localization data, the mapping data, the motion planning logic data, and the motion control command to the host equipment 2.

Further, the first device 31 is further used to send the synchronous localization data, the mapping data, the motion planning logic data, and the motion control command to the host equipment 2. The third device 33 further includes: a first unit 331 for the motion related logic data including the mapping data, synchronous localization data, and motion planning logic data and generating the mapping data and synchronous localization data based on the pre-processed and pre-fused plurality of items of sensing information, the low-level localization and navigation related information, and the high-level localization and navigation related information; a second unit 332 for generating the motion planning logic data and the motion control command for controlling the movement of the host equipment 2 based on the synchronous localization data, the mapping data, and the high-level localization and navigation related information of the host equipment 2.

Further, the second device 32 includes: a third unit configured to acquire the plurality of items of sensing information, wherein the plurality of items of sensing information includes at least any one of the following items: internal sensing information, external sensing information, and the sensing information of equipment 2; a fourth unit configured to pre-process and pre-fuse the plurality of items of sensing information.

Further, the first device 31 further includes a fifth unit configured to encapsulate the synchronous localization data, the mapping data, the motion planning logic data, and the motion control command according to a unified data protocol format; a sixth unit configured to send the encapsulated data to the host equipment 2.

Figure 6:
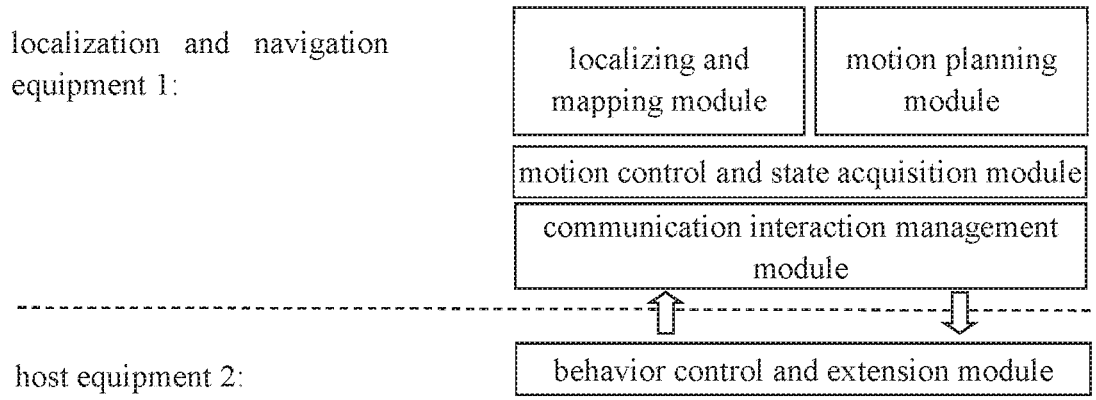
FIG. 6 is a cooperation structural schematic diagram of an autonomous localization and navigation equipment provided according to a preferred embodiment of the present application and a host equipment.

FIG. 6 shows a cooperation structural schematic diagram of the autonomous localization and navigation equipment 1 according to a preferred embodiment of the present application and the host equipment 2. Referring to FIG. 5 and FIG. 6, the autonomous localization and navigation equipment 1 includes: a localizing and mapping module, a motion planning module, a motion control and state acquisition module, and a communication interaction management module. The host equipment 2 includes a behavior control and expansion module. The localizing and mapping module corresponds to the first unit 331, the motion planning module corresponds to the second unit 332, and the motion control and state acquisition module corresponds to the second device 32, the communication interaction management module corresponds to the first device 31, and the behavior control and expansion module corresponds to the fourth device 41. For easier description, the above mentioned corresponding terms will be used interchangeably below.

The behavior control and expansion module supports the communication interaction management module to perform data transmission between the autonomous localization and navigation equipment 1 and the host equipment 2. Generally, the behavior control and expansion module are run inside the computer of the host equipment 2 in terms of physical implementation. However, in terms of software level, the behavior control and expansion module is still a part of the overall autonomous localization and navigation system.

The localization and mapping module constructs the mapping data and synchronous localization data. Specifically, the localization and mapping module is an implementation of the specific simultaneous localization and mapping (SLAM) algorithm, which may be a SLAM algorithm based on particle filtering and grid map model and using laser scanner as the main input signal, or a vision SLAM algorithm using two-dimensional data provided by the camera. The localizing and mapping module acquires input data through internal sensors and external sensors, and provides the map information and localization coordinate information obtained from operations to other modules inside the autonomous localization and navigation equipment 1 for use.

The motion planning module is responsible for controlling the actions of the host equipment 2. Generally, in implementations, the motion planning module includes map-based path planning algorithms such as A\*, D\*, and obstacle avoiding algorithms for leading host equipment 2 (robots) to avoid obstacles in real-time. According to specific application demands, the motion planning module may also include algorithms such as charging pile docking algorithm for autonomously returning back to get charged or a floor covering algorithm required by the sweeping robot. The other core function of the motion planning module is to receive the extension control instructions including the request of motion planning that the host equipment needs to perform or the request of motion control that the host equipment needs the low-level control device to perform sent back from the behavior control and expansion module of the external host equipment 2 for a fusion operation with the motion planning logic of itself, so as to realize more complex control logics that can extend and modify the existing motion planning algorithm.

The motion control and state acquisition module is responsible for collecting the internal sensing information, the external sensing information, and the host equipment sensing information from the host equipment 2, and performing necessary data pre-processing and fusing for the information then providing them to other modules inside the autonomous localization and navigation equipment for use. Additionally, the motion control and state acquisition module also serves as an abstraction layer for the differences of host equipment. The differences between the platforms of different host equipment 2 are hidden and the necessary simulations are made, so that the differences of specific host equipment 2 can be ignored by the localization and mapping module and the motion planning module run on the abstraction layer to the greatest extent, and a relatively universal implementation algorithm may be used.

The communication interaction management module acquires the low-level localization and navigation related information and the high-level localization and navigation related information of the host equipment 2 and is responsible for enabling a direct interaction with the host equipment 2 through the high-speed signal interface and the control signal interface of the autonomous localization and navigation equipment 1. The communication interaction management module may be considered as an abstraction layer of specific communication interfaces. The communication interaction management module is responsible for acquiring the data required by other modules of the autonomous localization and navigation equipment 1 from the host equipment 2 through the corresponding interface, and is responsible for transmitting the data sent to the host equipment 2 after the data is encapsulated in a unified data protocol format. Additionally, the motion control instructions and the motion related logic data are encapsulated correspondingly by the communication interaction management modules according to a unified protocol rule and then sent to the host equipment 2 after encapsulation.

In addition, the behavior control and extension module supports the communication interaction management module to perform data transmission between the autonomous localization and navigation equipment 1 and the host equipment 2 to assist the software system in the host equipment 2 to perform interactive collaboration with the autonomous localization and navigation equipment 1. Therefore, generally, the behavior control and extension module are run in the computer system of the host equipment 2. The behavior control and extension module may acquire the state information such as maps, location coordinates, etc. provided by other modules of the autonomous localization and navigation equipment 1 through the high-speed signal interface, and may perform operation such as invoking, execution, extension, and modification etc. to existing algorithms in the motion planning module through predefined motion planning extension commands. In specific implementations, generally, the behavior control and extension module are provided to the host equipment 2 in the form of software development kit (SDK) and is integrated with other software modules in the host equipment 2.

Those skilled in the art should understand that the specific descriptions of the algorithms of the autonomous localization and navigation mentioned above are all examples, and the algorithms that may appear in the future and are applicable to the present application may be included in the scope of the present application.

An autonomous localization and navigation system is provided according to yet another aspect of the present application. The autonomous localization and navigation system includes: the above-mentioned autonomous localization and navigation equipment 1 and host equipment 2. The host equipment 2 includes: a fourth device configured to send the low-level localization and navigation related information and the high-level localization and navigation related information of the host equipment 2 to the autonomous localization and navigation equipment 1, and acquire the motion control command sent by the autonomous localization and navigation equipment 1 for controlling the movement of the host equipment 2 and the motion related logic data for the host equipment 2 to perform business logic analysis.

Figure 7:
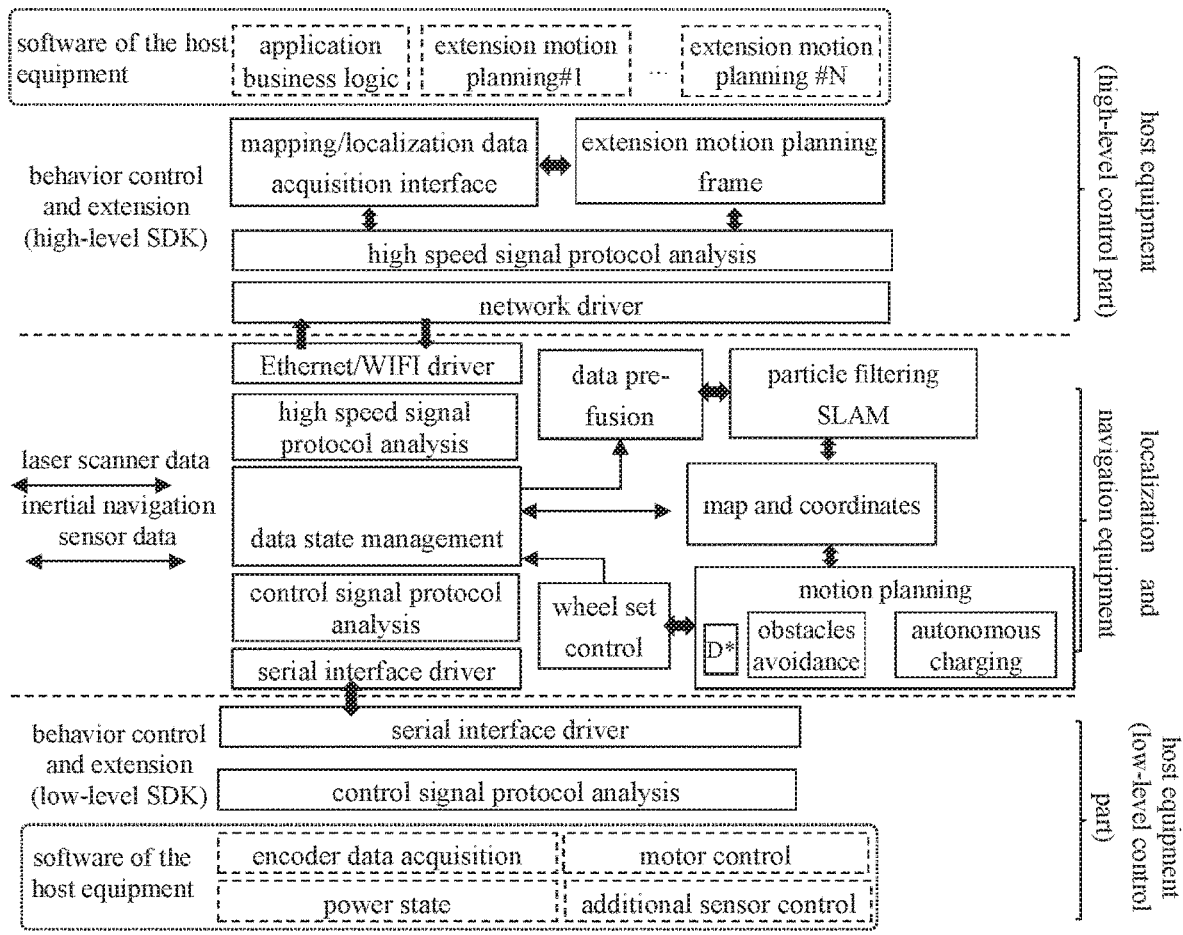
FIG. 7 is a cooperation structural schematic diagram of an autonomous localization and navigation equipment provided according to another preferred embodiment of the present application and a host equipment.

FIG. 7 is cooperation structural schematic diagram showing an autonomous localization and navigation equipment 1 provided according to yet another preferred embodiment of the present application and a host equipment 2.

The behavior control and extension module run on the host equipment 2 is divided into two parts according to the responsibilities, one is host oriented low-level control, another one is host oriented high-level business logic. The two parts correspond to the low-level SDK (software development kit) and the high-level SDK shown in the figure, respectively. The part oriented to the low-level control device of the host equipment 2 communicates with the main body of the autonomous localization and navigation equipment 1 through the control signal interface, and is responsible for transferring the robot motion signal with the host equipment 2 and transferring additional extension sensor data from the host equipment 2. The part oriented to the high-level control device of the host equipment 2 communicates with the main body of the autonomous localization and navigation equipment 1 through the high-speed signal interface, and provides the host equipment 2 with information such as map, localization coordinates etc. generated by the autonomous localization and navigation equipment 1. Moreover, the part oriented to the high-level control device of the host equipment 2 includes a sub-module called extension motion planning framework, so that the host equipment 2 can realize the invoking, extension, and behavior modification of the motion planning algorithm logics inside the localization and navigation module.

Inside the autonomous localization and navigation equipment 1, a laser scanner is used as an external sensor in the above-mentioned examples, therefore, the localizing and mapping module is implemented by a SLAM algorithm with grid map using particle filtering. The sensor data required by the SLAM is acquired by other modules and subjected to necessary data pre-fusion before it is finally read. After the processing is finished by the SLAM module, the obtained map and coordinate data are temporarily cached in the memory of the autonomous localization and navigation equipment for other modules and the external host equipment 2 to use.

A* D* path planning algorithm that can calculate the direct shortest path of any two points, an obstacle avoiding algorithm that help the host equipment 2 to avoid obstacles in the movement in real-time through respective sensor data, and a logic for autonomously returning back to the charging pile for docking and charging are configured inside the motion planning module. When the motion planning module operates, the control signals generated by its algorithmic operations will eventually be converted into wheel set control commands for the host equipment and transmitted to the host equipment 2 through the control signal interface.

It should be noted that the example mentioned above is merely a reference implementation of the software part of the autonomous localization and navigation equipment 1 described in the present invention. Any other specific implementation of software system module division that can achieve the same function and is consistent with the description of the present invention is acceptable.

Those skilled in the art should understand that the specific descriptions of the algorithms of the autonomous localization and navigation mentioned above are all examples, and for those that may appear in the future and are applicable to the present application may be included in the scope of the present application.

Figure 8:
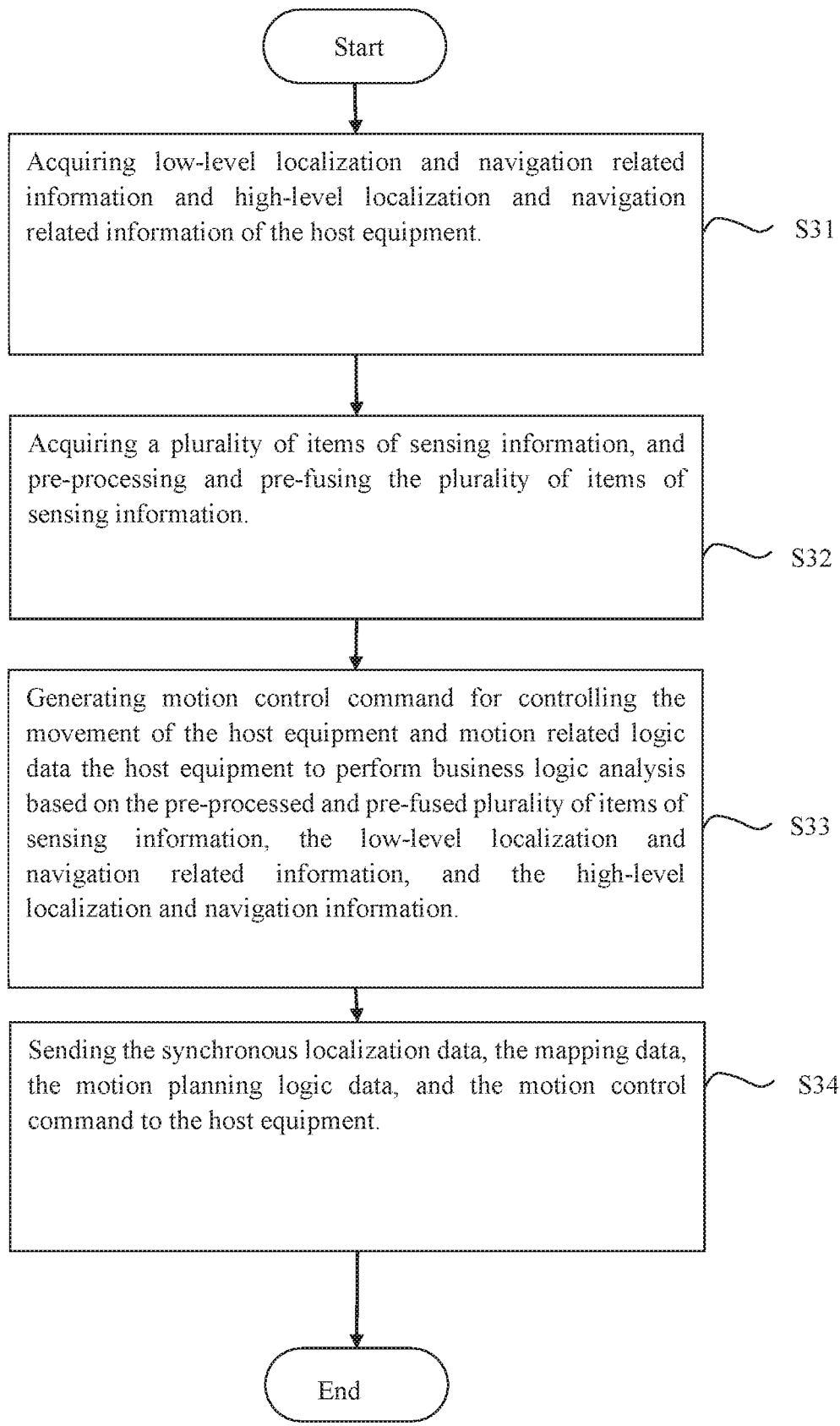
FIG. 8 shows a localization and navigation method provided according to a preferred embodiment of the present application.

FIG. 8 shows a localization and navigation method provided according to a preferred embodiment of the present application which includes: step S31, step S32, step S33, and step S34.

The step S31 includes: acquiring the low-level localization and navigation related information and the high-level localization and navigation related information of the host equipment 2. The step S32 includes: acquiring a plurality of items of sensing information and pre-processing and pre-fusing the plurality of items of sensing information. The step S33 includes: generating the motion control command for controlling the movement of the host equipment 2 and the motion related logic data for the host equipment 2 to perform business logic analysis based on the pre-processed and pre-fused plurality of items of sensing information, the low-level localization and navigation related information, and the high-level localization and navigation related information. The step S34 includes: sending the synchronous localization data, the mapping data, the motion planning logic data, and the motion control command to the host equipment 2.

Further, the motion related logic data includes the mapping data, the synchronous localization data, and the motion planning logic data. The step S33 includes: generating the mapping data and the synchronous localization data based on the pre-processed and pre-fused plurality of items of sensing information, the low-level localization and navigation related information, and the high-level localization and navigation information; generating the motion planning logic data and the motion control command for controlling the movement of the host equipment 2 based on the synchronous localization data, the mapping data, and the high-level localization navigation related information of the host equipment 2.

Further, the step S32 includes: acquiring the plurality of items of sensing information, wherein the plurality of items of sensing information includes at least any one of following items: internal sensing information, external sensing information, and host equipment 2 sensing information; pre-processing and pre-fusing the plurality of items of sensing information.

Further, the step S34 includes: encapsulating the synchronous localization data, the mapping data, the motion planning logic data, and the motion control command in a unified data protocol format; and sending the encapsulated data to the host equipment 2.

Further referring to FIG. 5 and FIG. 6, the autonomous localization and navigation equipment 1 includes: a localizing and mapping module, a motion planning module, a motion control and state acquisition module, and a communication interaction management module. The host equipment 2 includes a behavior control and expansion module. The localizing and mapping module corresponds to the first unit 331, the motion planning module corresponds to the second unit 332, and the motion control and state acquisition module corresponds to the second device 32, the communication interaction management module corresponds to the first device 31, and the behavior control and expansion module corresponds to the fourth device 41. For easier description, the above mentioned corresponding terms will be used interchangeably below.

In step S31, the communication interaction management module acquires the low-level localization and navigation related information and the high-level localization and navigation related information of the host equipment 2, and is responsible for enabling a direct interaction with the host equipment 2 through the high-speed signal interface (the hardware form interface or the software form interface) and the control signal interface (the hardware form interface or the software form interface) of the autonomous localization and navigation equipment 1, so the communication interaction management module may be considered as an abstraction layer for the specific communication interfaces. The communication interaction management module is responsible for acquiring the data required by other modules of the autonomous localization and navigation equipment 1 from the host equipment 2 through the corresponding interfaces, and is responsible for encapsulating the data sent to the host equipment 2 in a unified data protocol format and then transmitting.

In the step S32, the motion control and state acquisition module is responsible for collecting internal sensing information, external sensing information, and host equipment sensing information from the host equipment 2, and performing necessary data pre-processing and fusing on the information, then providing them to other modules inside the autonomous localization and navigation equipment to use. Additionally, the motion control and state acquisition module also serves as an abstraction layer for the differences of host equipment. The differences among platforms of different host equipment 2 are hidden and the necessary simulations are performed, so that the differences of specific host equipment 2 can be ignored by the localizing and mapping module and the motion planning module run on it to the greatest extent, and a relatively universal implementation algorithm is used.

In the step S33, the localizing and mapping module constructs map data and synchronous localization data, and the motion planning module generates the motion control instructions and motion related logic data. The localizing and mapping module is an implementation of specific simultaneous localization and mapping (SLAM) algorithm, which may be a SLAM algorithm based on particle filtering and grid map model and using laser scanner as the main input signal, or a vision SLAM algorithm using two-dimensional data provided by the camera. The localizing and mapping module acquires input data through internal sensors and external sensors, and provides the map information and localization coordinate information obtained from operations to other modules inside the autonomous localization and navigation equipment 1 for use. The motion planning module is responsible for controlling the actions of the host equipment 2. Generally, in implementations, the motion planning module includes map-based path planning algorithms such as A*, D*, and obstacle avoiding algorithms for leading host equipment 2 (robots) to avoid obstacles in real-time. According to specific application demands, the motion planning module may also include algorithms such as charging pile docking algorithm for autonomously returning back to get charged or a floor covering algorithm required by the sweeping robot. The other core function of the motion planning module is to receive the extension control instructions including the request of motion planning that the host equipment needs to perform or the request of motion control that the host equipment needs the low-level control device to perform sent back from the behavior control and expansion module of the external host equipment 2 for a fusion operation with the motion planning logic of itself, so as to realize more complex control logics that can extend and modify the existing motion planning algorithm.

In the step S34, the motion control instruction and the motion related logic data are encapsulated by the communication interaction management module correspondingly in a unified protocol rule and then sent to the host equipment 2.

Additionally, the behavior control and extension module supports the communication interaction management module to perform data transmission between the autonomous localization and navigation equipment 1 and the host equipment 2. Generally, the behavior control and expansion module are run inside the computer of the host equipment 2 in terms of physical implementation. However, in terms of software level, the behavior control and expansion module are still a part of the overall autonomous localization and navigation system. The behavior control and extension module is used to assist the software system in the host equipment 2 to interact with the autonomous localization and navigation equipment 1, thus generally, it is run in the computer system of the host equipment 2. The behavior control and extension module may acquire the state information such as map, location coordinates, etc. provided by other modules of the autonomous localization and navigation equipment 1 through the high-speed signal interface, and may perform operations such as invoking, execution, extension, and modification etc. on existing algorithms in the motion planning module through predefined motion planning extension commands. In specific implementations, the module is generally provided to the host equipment 2 in the form of software development kit (SDK) and is integrated with other software modules in the host equipment 2.

Those skilled in the art should be able to understand that the modular descriptions of respective devices for the autonomous localization and navigation described above are examples, for those that may appear in the future and applicable to the present application may be included in the scope of the present application.

Further referring to FIG. 7, the behavior control and extension module run on the host equipment 2 is divided into two parts according to the responsibilities, one is host low-level control oriented, another one is host high-level business logic oriented. The two parts correspond to the low-level SDK (software development kit) and the high-level SDK shown in the figure, respectively. The part oriented to the low-level control device of the host equipment 2 communicates with the main body of the autonomous localization and navigation equipment 1 through the control signal interface and is responsible for transferring the robot motion signal with the host equipment 2 and transferring additional extension sensor data from the host equipment 2. The part oriented to the high-level control device of the host equipment 2 communicates with the main body of the autonomous localization and navigation equipment 1 through the high-speed signal interface and provides the host equipment 2 with information such as map, localization coordinates etc. generated by the autonomous localization and navigation equipment 1. Moreover, the part oriented to the high-level control device of the host equipment 2 includes a sub-module called extension motion planning framework, so that the host equipment 2 can realize the invoking, extension, and behavior modification of the motion planning algorithm logics inside the localization and navigation module.

Inside the autonomous localization and navigation equipment 1, a laser scanner is used as an external sensor, therefore, the localizing and mapping module is implemented by a SLAM algorithm with grid map using particle filtering. The sensor data required by the SLAM is acquired by other modules and subjected to necessary data pre-fusion before it is finally read. After the processing is finished by the SLAM module, the obtained map and coordinate data are temporarily cached in the memory of the autonomous localization and navigation equipment for other modules and the external host equipment 2 to use.

A D* path planning algorithm that can calculate the direct shortest path of any two points, an obstacle avoiding algorithm that help the host equipment 2 to avoid obstacles in the movement in real-time through respective sensor data, and a logic for autonomously returning back to the charging pile for docking and charging are configured inside the motion planning module. When the motion planning module operates, the control signals generated by its algorithmic operations will eventually be converted into wheel set control commands for the host equipment 2 and transmitted to the host equipment 2 through the control signal interface.

It should be noted that the example mentioned above is merely a reference implementation of the software part of the autonomous localization and navigation equipment 1 described in the present invention. Any other specific implementation of software system module division that can achieve the same function and is consistent with the description of the present invention is acceptable.

Compared with the prior art, according to an embodiment of the present application, the autonomous localization and navigation equipment 1 of the present application has the following advantages. The autonomous localization and navigation equipment is highly modularized, which greatly reduces the coupling degree with the host equipment, so the equipment is convenient to be integrated to the existing host equipment and it is flexibly expandable. Thus, the host equipment 2 such as a robot etc. has a more concise and clear system constitution, thereby greatly reducing the development difficulty and developing time of the host equipment 2 having the autonomous localization and navigation equipment 1. Moreover, as a result of the high degree of modularization of the autonomous localization and navigation equipment, it is possible to miniaturize the host equipment 2.

Further, by inducing most of the sensing information dependences required by the autonomous localization and navigation system, the processing of the plurality of items of sensing information is integrated to the autonomous localization and navigation equipment 1 itself, thereby reducing the coupling degree with the host equipment 2.

Further, with the first transmission device and the second transmission device, a unified external communication interface and a protocol standard with high flexibility are formed by the autonomous localization and navigation equipment 1, so that any host equipment 2 conforming to the protocol standard of the interface can be easily connected to the autonomous localization and navigation equipment 1 and realize the functional expansion.

It should be noted that the present invention may be implemented in software and/or a combination of software and hardware, for example, an application specific integrated circuit (ASIC), a general computer, or any other similar hardware device may be used in implementations. In one embodiment, the software program of the present invention may be executed by a processor to realize the steps or functions described above. Similarly, the software program (including related data structures) of the present invention may be stored in a computer-readable recording medium, for example, RAM memory, magnetic or optical driver, or floppy disk and the similar devices. In addition, some steps or functions of the present invention may be implemented through hardware, for example, a circuit that cooperates with a processor to perform respective steps or functions.

In addition, a part of the present invention may be applied as a computer program product, for example, computer program instructions. When the computer program instructions are executed by a computer, the method and/or technical solution according to the present invention may be invoked or provided through the operations of the computer. The program instructions that invoke the method of the present invention may be stored in a fixed or removable recording medium and/or transmitted through data stream in broadcast or other signal carrying medium, and/or stored in the work memory of the computer equipment which is run according to the program instructions. Here, according to an embodiment of the present invention, a device is included. The device includes a memory for storing computer program instructions and a processor for executing the program instructions. When the computer program instructions are executed by the processor, the device is triggered to run the methods and/or technical solutions of the various embodiments of the present invention describe before.

For those skilled in the art, it is obvious that the present invention is not limited to the details of the above mentioned exemplary embodiments, and the present invention may be implemented in other specific forms without departing from the spirit or basic characteristics of the present invention. Therefore, for all intents, the embodiments should be regarded as exemplary and not restrictive. The scope of the present invention is defined by the appended claims rather than the above mentioned description, therefore, all changes fall within the meaning and scope of equivalent elements of the claims should be included in the present invention. Any reference numerals in the claims should not be regarded as limits to the involved claims. Additionally, it is obvious that the term "include" does not exclude other units or steps, and the singular does not exclude the plural. The plurality of units or devices recited in the claims of device may also be implemented by a unit or device through software or hardware. Terms such as first, second, etc. are used to indicate names rather than any specific order.

What is claimed is:

1. An autonomous localization and navigation equipment comprising:
    a first transmission device,
    a second transmission device, and
    a processing device;
    wherein the first transmission device performs a first data communication with a low-level device of a host equipment to acquire low-level localization and navigation related information and send a motion control command for controlling a movement of the host equipment;
    wherein the second transmission device performs a second data communication with a high-level device of the host equipment to acquire high-level localization and navigation related information and send motion related logical data for the host equipment to perform a business logic analysis;
    wherein the processing device acquires platform parameters of the host equipment, wherein the platform parameters comprise a host equipment size, a position, a driving mode, and one or more sensor types installed on the host equipment; and
    wherein the processing device acquires a plurality of items of sensing information, the low-level localization and navigation related information, and the high-level localization and navigation related information, and based on the acquired plurality of items and the platform parameters of the host equipment, the processing device generates the motion related logic data and the motion control command.

2. The autonomous localization and navigation equipment of claim 1, wherein the autonomous localization and navigation equipment further comprises an internal sensor and an external sensor; and wherein the processing device acquires the plurality of items of sensing information from the internal sensor and the external sensor.

3. The autonomous localization and navigation equipment of claim 2, wherein the internal sensor comprises at least one item selected from the group consisting of gyroscope, acceleration sensor, electronic compass, temperature sensor, humidity sensor, air pressure sensor; and wherein the external sensor comprises at least one item selected from the group consisting of laser scanner, sonar radar, vision sensor, and ultra-wideband beacon sensor.

4. The autonomous localization and navigation equipment of claim 2, wherein the processing device comprises a main processing unit and a sub-processing unit, wherein the main processing unit generates the motion related logic data and the motion control command of the host equipment based on the plurality of items of sensing information, the low-level localization and navigation related information, and the high-level localization and navigation related information; and wherein the sub-processing unit acquires the plurality of items of sensing information from the internal sensor in real-time to acquire an attitude resolving task, and sends the motion control command to a low-level control device of the host equipment through the first transmission device.

5. The autonomous localization and navigation equipment of claim 1, wherein the first transmission device also acquires host equipment sensing information from the low-level control device of the host equipment; and wherein the processing device generates the motion control related information of the host equipment based on the host equipment sensing information, the plurality of items of sensing information, the low-level localization and navigation related information, and the high-level localization and navigation related information.

6. The autonomous localization and navigation equipment of claim 1, wherein the first transmission device comprises at least one item selected from the group consisting of UART serial interface, CAN bus, SPI bus, and an $I^2C$ bus; and wherein the second transmission device comprises at least one item selected from the group consisting of ethernet interface, wireless network interface, USB interface, and optical fiber interface.

7. The autonomous localization and navigation equipment of claim 1, wherein the low-level localization and navigation related information comprises host equipment wheel set state information;
    wherein the high-level localization and navigation related information comprises a request of motion planning that the host equipment needs to perform and a request of motion control that the host equipment needs the low-level control device to perform;
    wherein the motion related logical data comprises mapping data, synchronous localization data, and motion planning logic data; and
    wherein the processing device generates the mapping data and the synchronous localization data based on the plurality of items of sensing information, the low-level localization and navigation related information, and the high-level localization and navigation related information, and generates the motion planning logic data and the motion control command based on the synchronous localization data, the mapping data, and the high-level localization and navigation related information of the host equipment.

8. The autonomous localization and navigation equipment of claim 1, wherein the low-level localization and navigation related information further comprises parameter information of the host equipment;
    wherein the processing device also generates a motion initial control command based on the parameter information; and wherein the first transmission device sends the motion initial control command to a low-level device of the host equipment.

9. A method of localization and navigation using an autonomous localization and navigation equipment, wherein the autonomous localization and navigation equipment is used to localize and navigate a host equipment;
   wherein the autonomous localization and navigation equipment comprises a processing device, a first transmission device, and a second transmission device; and wherein the method comprises the steps of:
   A, acquiring, by the first transmission device, low-level localization and navigation related information from a low-level control device of the host equipment;
   acquiring, by the second transmission device, high-level localization and navigation related information from a high-level control device of the host equipment;
   wherein the processing device acquires platform parameters of the host equipment, wherein the platform parameters comprise a host equipment size, a position, a driving mode, and one or more sensor types installed on the host equipment;
   B, acquiring, by the processing device, a plurality of items of sensing information, the low-level localization and navigation related information, and the high-level localization and navigation related information;
   based on the acquired plurality of items and the platform parameters of the host equipment, generating a motion control command for controlling a movement of the host equipment and motion related logic data for the host equipment to perform a business logic analysis;
   C, sending the motion control command, by the first transmission device, to the low-level control device of the host equipment; and
   sending, by the second transmission device, the motion related logic data to the high-level control device of the host equipment.

10. The method of localization and navigation using an autonomous localization and navigation equipment of claim 9, wherein the autonomous localization and navigation equipment further comprises an internal sensor and an external sensor; and
   wherein acquiring, by the processing device, the step B further comprises: acquiring the plurality of items of sensing information from the internal sensor and the external sensor.

11. The method of localization and navigation using an autonomous localization and navigation equipment of claim 9, wherein acquiring, by the first transmission device, the step A further comprises: acquiring host equipment sensing information from the low-level control device of the host equipment; and
   wherein generating, by the processing device, the step B further comprises: generating motion control related information of the host equipment based on the host equipment sensing information, the plurality of items of sensing information, the low-level localization and navigation related information, and the high-level localization and navigation related information.

12. The method of localization and navigation using an autonomous localization and navigation equipment of claim 9, wherein the low-level localization and navigation related information comprises host equipment wheel set state information;
   wherein the high-level localization and navigation related information comprises a request of motion planning that the host equipment needs to perform and a request of motion control that the host equipment needs a low-level control device to perform;
   wherein the motion related logic data comprises mapping data, synchronous localization data, and motion planning logic data;
   wherein generating, by the processing device, the step B further comprises:
   generating the mapping data and the synchronous localization data based on the plurality of items of sensing information, the low-level localization and navigation related information, and the high-level localization and navigation related information; and
   generating the motion planning logic data and the motion control command based on the synchronous localization data, the mapping data, and the high-level localization and navigation related information of the host equipment.

13. The method of localization and navigation using an autonomous localization and navigation equipment of claim 12, wherein the low-level localization and navigation related information further comprises parameter information of the host equipment;
   wherein generating, by the processing device, the step B further comprises: generating a motion initial control command based on the parameter information;
   wherein sending, by the first transmission device, the step C further comprises: sending, the motion initial control command to the low-level device of the host equipment.

14. A localization and navigation method comprising the steps of:
   A, acquiring low-level localization and navigation related information of a host equipment through the first transmission device and acquiring high-level localization and navigation related information of the host equipment through the second transmission device;
   wherein the processing device acquires platform parameters of the host equipment, wherein the platform parameters comprise a host equipment size, a position, a driving mode, and one or more sensor types installed on the host equipment;
   B, acquiring a plurality of pre-processed and pre-fused items of sensing information and processing and fusing the plurality of items of sensing information;
   C, based on the acquired plurality of items and the platform parameters of the host equipment, generating a motion control command for controlling a movement of the host equipment and motion related logic data for the host equipment to perform a business logic analysis based on processed and fused plurality of items of sensing information, the low-level localization and navigation related information, and the high-level localization and navigation related information; and
   D, sending synchronous localization data, mapping data, motion planning logic data, and a motion control command to the host equipment.

15. The localization and navigation method of claim 14, wherein the motion related logic data comprises the mapping data, the synchronous localization data, and the motion planning logic data;
   wherein generating a motion control command for controlling a movement of the host equipment and motion related logic data for the host equipment the step C further comprises:
   generating the mapping data and the synchronous localization data based on the processed and fused plurality of items of sensing information, the low-level localization and navigation related information, and the high-level localization and navigation related information; and generating the motion planning logic data and the motion control command for controlling the movement of the host equipment based on the synchronous localization data, the mapping data, and the high-level localization and navigation related information of the host equipment.

16. The localization and navigation method of claim 15, wherein sending synchronous localization data, mapping data, motion planning logic data, and a motion control command to the host equipment the step D further comprises:

encapsulating acquired synchronous localization data, mapping data, motion planning logic data, and motion control command according to a unified data protocol format; and sending the encapsulated data to the host equipment.

17. The localization and navigation method of claim 14, wherein acquiring a plurality of items of sensing information and pre-processing and pre-fusing the plurality of items of sensing information the step B further comprises:

acquiring the plurality of items of sensing information, wherein the plurality of items of sensing information comprises at least one item selected from the group consisting of internal sensing information, external sensing information, and host equipment sensing information; and processing and fusing the plurality of items of sensing information.

18. An autonomous localization and navigation equipment comprising:

a first device configured to acquire low-level localization and navigation related information and high-level localization and navigation related information of a host equipment;

a second device configured to acquire a plurality of pre-processed and pre-fused items of sensing information and process and fuse the plurality of items of sensing information; and a third device, wherein the third device acquires platform parameters of the host equipment, wherein the platform parameters comprise a host equipment size, a position, a driving mode, and one or more sensor types installed on the host equipment; and wherein the third device, based on the acquired plurality of items and the platform parameters of the host equipment, is configured to generate a motion control command for controlling a movement of the host equipment and motion related logic data for the host equipment to perform a business logic analysis based on processed and fused plurality of items of sensing information, the low-level localization and navigation related information, and the high-level localization and navigation related information;

wherein the first device is also used to send synchronous localization data, mapping data, motion planning logic data, and the motion control command to the host equipment.

19. The autonomous localization and navigation equipment of claim 18, wherein the motion related logic data comprises the mapping data, the synchronous localization data, and the motion planning logic data;

wherein the third device comprises:

a first unit configured to generate the mapping data and the synchronous localization data based on the processed and fused plurality of items of sensing information, the low-level localization and navigation related information, and the high-level localization and navigation related information;

a second unit configured to generate the motion planning logic data and the motion control command for controlling the movement of the host equipment based on the synchronous localization data, the mapping data, and the high-level localization and navigation related information of the host equipment.

20. The autonomous localization and navigation equipment of claim 19, wherein the first device further comprises:

a fifth unit configured to encapsulate acquired synchronous localization data, mapping data, motion planning logic data, and motion control command according to a unified data protocol format;

a sixth unit configured to send encapsulated data to the host equipment.

21. The autonomous localization and navigation equipment of claim 18, wherein the second device comprises:

a third unit configured to acquire the plurality of items of sensing information, wherein the plurality of items of sensing information comprises at least one item selected from the group consisting of: internal sensing information, external sensing information, and host equipment sensing information; and a fourth unit configured to process and fuse the plurality of items of sensing information.

22. An autonomous localization and navigation system, wherein the autonomous localization and navigation system comprises:

an autonomous localization and navigation equipment comprising a first device configured to acquire low-level localization and navigation related information and high-level localization and navigation related information of a host equipment;

a second device configured to acquire a plurality of pre-processed and pre-fused items of sensing information and processing and fusing the plurality of items of sensing information; and a third device, wherein the third device acquires platform parameters of the host equipment, wherein the platform parameters comprise a host equipment size, a position, a driving mode, and one or more sensor types installed on the host equipment; and wherein the third device, based on the acquired plurality of items and the platform parameters of the host equipment, is configured to generate a motion control command for controlling a movement of the host equipment and motion related logic data for the host equipment to perform a business logic analysis based on processed and fused plurality of items of sensing information, the low-level localization and navigation related information, and the high-level localization and navigation related information;

wherein the first device is also used to send synchronous localization data, mapping data, motion planning logic data, and the motion control command to the host equipment;

a host equipment comprising:

a fourth device configured to send low-level localization and navigation related information and high-level localization and navigation related information of the host equipment to the autonomous localization and navigation equipment, and acquire the motion control command sent by the autonomous localization and navigation equipment for controlling a movement of the host equipment and motion related logic data for the host equipment to perform a business logic analysis send by the host equipment.

* * * * *